US012695134B2

(12) United States Patent
Zhang

(10) Patent No.: US 12,695,134 B2
(45) Date of Patent: Jul. 28, 2026

(54) BATTERY PACK THERMAL ENERGY MANAGEMENT ASSEMBLY AND THERMAL ENERGY MANAGEMENT METHOD

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 801 days.

(21) Appl. No.: 17/956,045

(22) Filed: Sep. 29, 2022

(65) Prior Publication Data

US 2024/0113358 A1    Apr. 4, 2024

(51) Int. Cl.

| | |
|---|---|
| *H01M 10/50* | (2006.01) |
| *H01M 10/6557* | (2014.01) |
| *H01M 10/6563* | (2014.01) |
| *H01M 10/6567* | (2014.01) |
| *H01M 10/613* | (2014.01) |
| *H01M 10/615* | (2014.01) |
| *H01M 10/625* | (2014.01) |

(52) U.S. Cl.
CPC ... *H01M 10/6557* (2015.04); *H01M 10/6563* (2015.04); *H01M 10/6567* (2015.04); *H01M 10/613* (2015.04); *H01M 10/615* (2015.04); *H01M 10/625* (2015.04); *H01M 2220/20* (2013.01)

(58) Field of Classification Search
CPC ......... H01M 10/6557; H01M 10/6556; H01M 10/6555; H01M 10/6554; H01M 10/6563; H01M 10/6567; H01M 10/613; H01M 10/615; H01M 10/625; H01M 2220/20
See application file for complete search history.

(56) References Cited

U.S. PATENT DOCUMENTS

| | | | |
|---|---|---|---|
| 7,172,831 B2 | 2/2007 | Jaura et al. | |
| 7,661,370 B2 | 2/2010 | Pike et al. | |
| 8,679,659 B2 | 3/2014 | Claypole et al. | |
| 11,271,263 B2 | 3/2022 | Shao et al. | |
| 2002/0005708 A1* | 1/2002 | Kobayashi | H01M 10/617 |
| | | | 320/107 |
| 2012/0088130 A1 | 4/2012 | Becker et al. | |
| 2015/0340671 A1 | 11/2015 | Subramanian et al. | |
| 2019/0221899 A1 | 7/2019 | Tomai et al. | |
| 2020/0406784 A1* | 12/2020 | Yoshida | B60K 1/00 |

FOREIGN PATENT DOCUMENTS

| | | |
|---|---|---|
| CN | 201980069 U | 9/2011 |
| CN | 105552478 B | 3/2018 |
| JP | 2014203766 A | 10/2014 |

* cited by examiner

*Primary Examiner* — Raymond Alejandro
(74) *Attorney, Agent, or Firm* — David B. Kelley; Carlson, Gaskey & Olds, P.C.

(57) ABSTRACT

A battery pack assembly includes a cell stack having a plurality of battery cells distributed along an axis and a plurality of thermal energy transfer assemblies distributed along the axis. Each thermal energy transfer assembly is disposed axially between a first battery cell and a second battery cell. Each thermal energy transfer assembly provides a channel configured to communicate a flow of air between the first battery cell and the second battery cell. A coolant plate assembly is adjacent the cell stack. The coolant plate assembly includes at least one coolant path configured to communicate a liquid coolant.

19 Claims, 2 Drawing Sheets

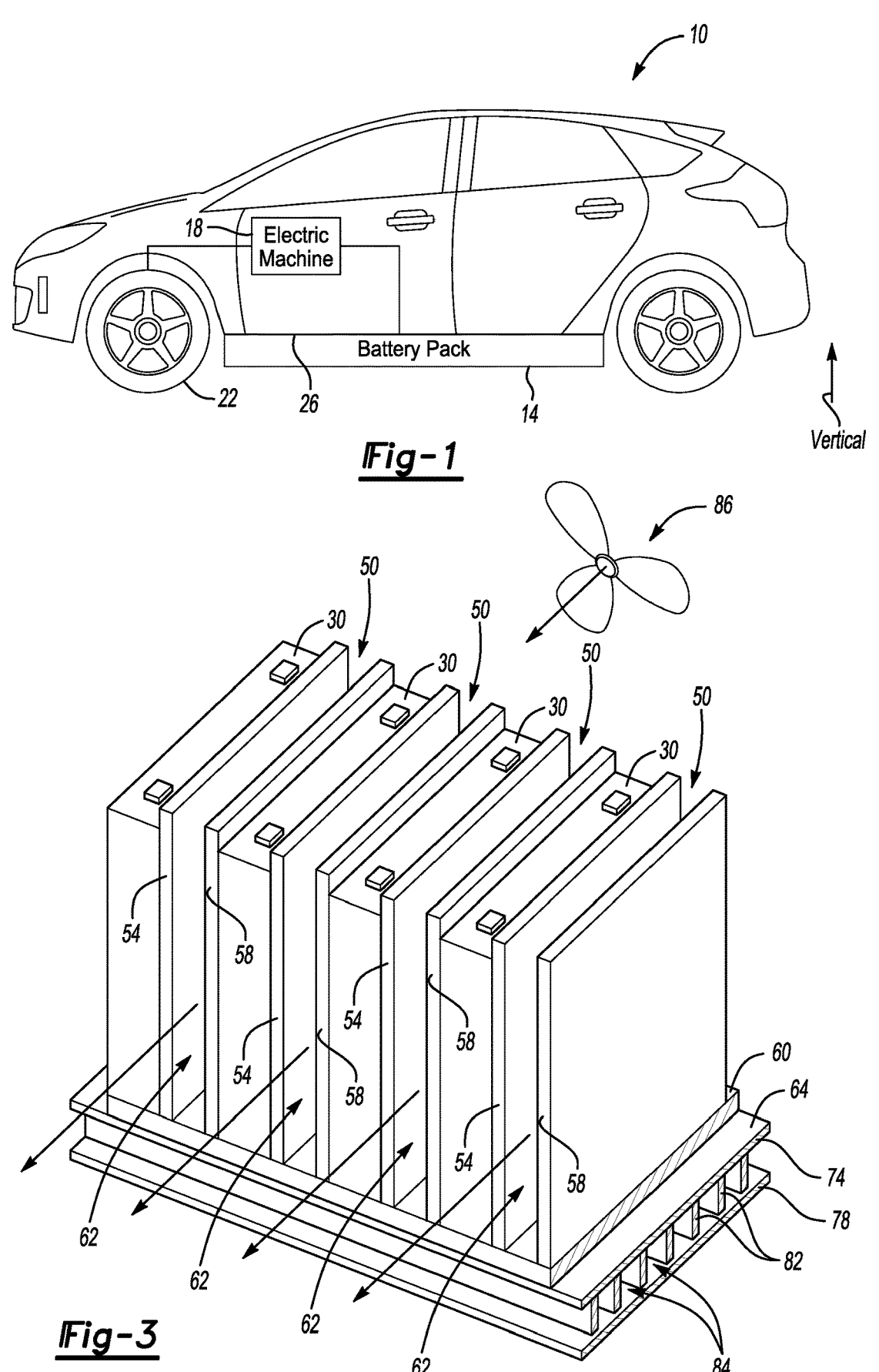
_Fig-1_
_Fig-3_

BATTERY PACK THERMAL ENERGY MANAGEMENT ASSEMBLY AND THERMAL ENERGY MANAGEMENT METHOD

TECHNICAL FIELD

This disclosure relates generally to communicating thermal energy from a battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a battery pack assembly, including: a cell stack including a plurality of battery cells distributed along an axis and a plurality of thermal energy transfer assemblies distributed along the axis, each thermal energy transfer assembly disposed axially between a first battery cell within the plurality of battery cells and a second battery cell within the plurality of battery cells, each thermal energy transfer assembly providing a channel configured to communicate a flow of air between the first battery cell and the second battery cell; and a coolant plate assembly adjacent the cell stack, the coolant plate assembly including at least one coolant path configured to communicate a liquid coolant.

In some aspects, the techniques described herein relate to a battery pack assembly, wherein each thermal energy transfer assembly within the plurality of thermal energy transfer assemblies includes a first sheet and a second sheet, the first sheet and the second sheet extending from a base sheet that is sandwiched between the coolant plate assembly and the cell stack, the base sheet configured to communicate thermal energy from the first sheet and the second sheet to the coolant plate assembly.

In some aspects, the techniques described herein relate to a battery pack assembly, wherein the base sheet is vertically between the cell stack and the coolant plate assembly.

In some aspects, the techniques described herein relate to a battery pack assembly, wherein the first sheet and the second sheet are connected directly to the base sheet.

In some aspects, the techniques described herein relate to a battery pack assembly, wherein the first sheet and the second sheet extend vertically upward from the base sheet.

In some aspects, the techniques described herein relate to a battery pack assembly, wherein the first sheet directly contacts an axially facing side of the first cell, and the second sheet directly contacts an axially facing side of the second cell.

In some aspects, the techniques described herein relate to a battery pack assembly, further including a fan configured to move a flow of air through the channel.

In some aspects, the techniques described herein relate to a battery pack assembly, further including a heater configured to heat the flow of air prior to the flow of air moving through the channel.

In some aspects, the techniques described herein relate to a battery pack assembly, further including a chiller configured to cool the flow of air prior to the flow of air moving through the channel.

In some aspects, the techniques described herein relate to a battery pack assembly, wherein the cell stack is part of a traction battery pack assembly.

In some aspects, the techniques described herein relate to a battery pack assembly, wherein the first battery cell and the second battery cell are axially adjacent to each other.

In some aspects, the techniques described herein relate to a method of managing thermal energy within a battery pack, including: selectively moving a liquid coolant through a coolant plate assembly to manage thermal energy in a cell stack, the cell stack disposed adjacent the coolant plate assembly; and selectively moving a flow of air through a channel between a first battery cell and a second battery cell of the cell stack to manage thermal energy level in the cell stack.

In some aspects, the techniques described herein relate to a method, further including establishing the channel using a first sheet that is in direct contact with the first battery cell and a second sheet that is in direct contact with the second battery cell.

In some aspects, the techniques described herein relate to a method, further including communicating thermal energy from the first sheet and the second sheet to a base sheet that is sandwiched between the coolant plate assembly and the cell stack.

In some aspects, the techniques described herein relate to a method, wherein the first sheet and the second sheet are connected directly to the base sheet.

In some aspects, the techniques described herein relate to a method, further including heating or cooling the cell stack using the flow of air.

In some aspects, the techniques described herein relate to a method, further including additionally cooling the cell stack by communicating the liquid coolant through the coolant plate assembly.

In some aspects, the techniques described herein relate to a method, further including activating a fan to move the flow of air through the channel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a side view of an electrified vehicle having a traction battery pack.

FIG. 3 illustrates a close-up view of a portion of a cell stack from the traction battery pack.

DETAILED DESCRIPTION

Figure 2:
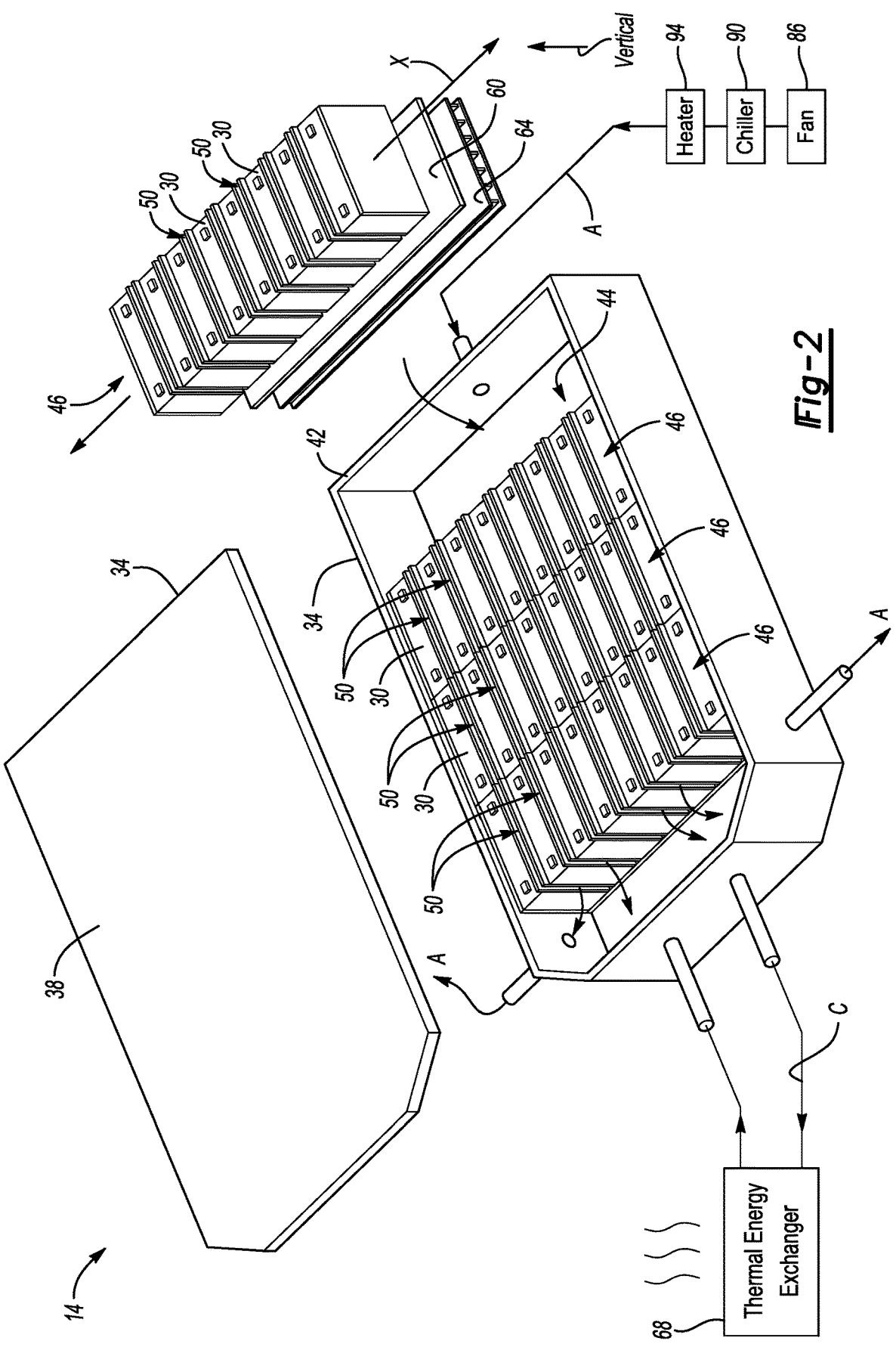
FIG. 2 illustrates an expanded perspective view of the traction battery pack of FIG. 1 according to an exemplary aspect of the present disclosure.

This disclosure details example traction battery pack assemblies having sheets between adjacent cells within a cell stack. The sheets establish an channel. Air can be moved through the channel to manage thermal energy.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

With reference now to FIGS. 2 and 3, the traction battery pack assembly 14 includes a plurality of battery cells 30 held within an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the plurality of battery cells 30.

The plurality of battery cells (or simply, "cells") 30 are for supplying electrical power to various components of the electrified vehicle 10. The battery cells 30 are stacked side-by-side relative to one another to construct a cell stack 46. In this example, each cell stack 46 includes eight individual battery cells 30, and the battery pack 14 includes four cell stacks 46 within the interior area 44 of the enclosure assembly 34.

Although a specific number of battery cells 30 and cells stacks 46 are illustrated in the various figures of this disclosure, the traction battery pack assembly 14 could include any number of cells 30 and cell stacks 46. In other words, this disclosure is not limited to the specific configuration of cells 30 shown in FIGS. 2 and 3.

In an embodiment, the battery cells 30 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

Each of the cell stacks 46 includes a plurality of the cells 30 distributed along an axis X. The cell stacks 46 also include a plurality of thermal energy transfer assemblies 50 distributed along the axis X. Each of the thermal energy transfer assemblies 50 is disposed between axially adjacent cells 30 of the cell stack 46. Along the axis X, the cells 30 alternate with thermal energy transfer assemblies 50.

The example thermal energy transfer assemblies 50 each include a first sheet 54 and a second sheet 58. The first sheet 54 is spaced from the second sheet 58 to provide an air channel 62. In this example, the first sheet 54 is spaced from two to three millimeters from the second sheet 58 to provide an air channel 62 that is from two to three millimeters wide. The first sheet 54 and the second sheet 58 can be a metal or metal alloy material having relatively high thermal conductivity. The first sheet 54 and the second sheet 58 are copper, in some examples.

Within the enclosure assembly 34, the cell stacks 46 are disposed on a base sheet 60, which is disposed on a coolant plate assembly 64. The base sheet 60, in this example, is sandwiched between the coolant plate assembly 64 and the cell stack 46. The base sheet 60 is a relative thin sheet of material. The base sheet 60 is configured to communicate thermal energy from the first sheet 54 and the second sheet 58 to the coolant plate assembly 64. The base sheet 60 can be connected to the coolant plate assembly 64 using an adhesive, for example.

The first sheet 54 and the second sheet 58 rest on the base sheet 60 in direct contact with the base sheet 60. In some examples, the first sheet 54 and the second sheet 58 can be directly connected to the base sheet 60.

The first sheet 54 and the second sheet 58 extend vertically upward from the base sheet 60 in this example. Vertical, for purposes of this disclosure, is with reference to ground and a generally orientation of the battery pack 14 when installed within the vehicle 10. The base sheet 60 is vertically between the cell stack 46 and the coolant plate assembly 64.

The first sheet 54 directly contacts an axially facing side of a first one of the cells 30 in the cells stack 46. The second sheet 58 directly contacts an axially facing side of a second one of the cells 30. The first one of the cells 30 is axially adjacent the second one of the cells 30.

A flow of liquid coolant C circulates through the coolant plate assemblies 64 to, in this example, remove thermal energy from the battery pack 14. After the flow of coolant C takes on thermal energy within the enclosure assembly 34, the flow of coolant C moves from the enclosure assembly 34 to a thermal energy exchanger 68, such as a radiator. Thermal energy is releases from the flow of coolant C at the thermal energy exchanger 68. The flow of coolant C is then circulated back through the coolant plate assemblies 64 within the battery pack 14.

The thermal energy transfer assemblies 50 facilitate movement of thermal energy to the coolant plate assembly 64. In particular, each battery cell 30 is sandwiched between two sheets—the first sheet 54 of one of the thermal energy transfer assemblies 50 and the second sheet 58 of another of the thermal energy transfer assemblies 50. Thus, two sheets in direct contact with respective axially facing sides of one of the battery cells 30 can take on thermal energy from that battery cell 30.

Thermal energy then moves through the sheets to the base sheet 60. Thermal energy spreads through the base sheet 60 and can then transfer from the base sheet 60 to the coolant plate assembly 64.

The coolant plate assembly 64 can be a metal or metal alloy material, such as aluminum. The coolant plate assembly 64, in this example, include a first plate 74, a second plate 78 spaced a distance from the first plate 74, and a plurality of fins 82 extending between the first plate 74 and the second plate 78. The spacing establishes a plurality of coolant paths 84 within the coolant plate assembly 64 that can be used to communicate the flow of coolant C through the coolant plate assembly 64.

Thermal management is additionally facilitated using a flow of air A communicated through the air channels 62 to manage thermal energy level within the cell stack 46. The flow of air A can be communicated through the air channels 62 to manage thermal energy levels instead of, or in addition to, the flow of coolant C being moved through the coolant paths 84 in the coolant plate assembly 64.

A fan 86 is used to move the flow of air A through the air channels 62. The flow of air A from the fan 86 can be cooled by a chiller 90 or heated by a heater 94. In this example, when cooling the cell stack 46 is desired, the heater 94 is deactivated and the chiller 90 is activated to cool the flow of air A moving to the battery pack 14 from the fan 86. In this example, when heating the cell stack 46 is desired, the chiller 90 is deactivate and the heater 94 is activates to heat the flow of air A moving to the battery pack 14 from the fan 86. The fan 86, chiller 90, and heater 94 can be electrically powered.

In an example method, thermal energy levels of the battery cells 30 are monitored. The temperatures of the cells 30 can then be then compared to a low operating temperature threshold, a high operating temperature threshold, and a thermal event threshold. The low operating temperature threshold is lower than the high operating temperature threshold, which is less than the thermal event threshold. A controller module of the vehicle 10 can automatically activate the fan 86, the chiller, and the heater 94 in response to the monitoring and comparison.

If a temperature of one or more of the cells 30 is less than or equal to the low operating temperature threshold, the fan 86 and the heater 94 are activated. The flow of air A heated by the heater 94 then moves through the air channels 62. The flow of air A heats the first sheets 54 and the second sheets 58, which warm the associated cells 30. The cells 30 may operate more efficiently when operating at temperatures above the low temperature threshold.

If a temperature of one or more of the cells 30 is above the low operating temperature threshold but less than or equal to the high operating temperature threshold, the fan 86, the chiller 90, and the heater 94 can be deactivated. As needed, the flow of coolant C can then be circulated through the coolant plate assembly 64 to adjust a temperature of the battery cells 30.

If the monitoring reveals that the temperature of one or more of the battery cells 30 is above the high temperature operating threshold but less than or equal to the thermal event threshold, the fan 86 can be activated while the heater 94 and chiller 90 are deactivated. The flow of air A moving through the air channels 62 can then cool the first sheets 54 and the second sheets 58 to cool the battery cells 30.

If the monitoring reveals the temperature of one or more of the battery cells 30 is above the thermal event threshold, the chiller 90 and fan 86 are activated while the heater 94 is deactivated. The flow of air A cooled by the chiller 90 can move through the air channels 62 to cool the cells 30.

The thermal management assemblies and methods of this disclosure can help to reduce thermal energy transfer between cells and cells stacks of a battery pack. The thermal management approaches are flexible as liquid coolant, air, or both can be utilized.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack assembly, comprising:
a cell stack including a plurality of battery cells distributed along an axis and a plurality of thermal energy transfer assemblies distributed along the axis, each thermal energy transfer assembly disposed axially between a first battery cell within the plurality of battery cells and a second battery cell within the plurality of battery cells, each thermal energy transfer assembly providing a channel configured to communicate a flow of air between the first battery cell and the second battery cell;

a coolant plate assembly adjacent the cell stack, the coolant plate assembly including at least one coolant path configured to communicate a liquid coolant; and
a fan configured to move a flow of air through the channel.

2. The battery pack assembly of claim 1, wherein each thermal energy transfer assembly within the plurality of thermal energy transfer assemblies includes a first sheet and a second sheet, the first sheet and the second sheet extending from a base sheet that is sandwiched between the coolant plate assembly and the cell stack, the base sheet configured to communicate thermal energy from the first sheet and the second sheet to the coolant plate assembly.

3. The battery pack assembly of claim 2, wherein the base sheet is vertically between the cell stack and the coolant plate assembly.

4. The battery pack assembly of claim 2, wherein the first sheet and the second sheet are connected directly to the base sheet.

5. The battery pack assembly of claim 2, wherein the first sheet and the second sheet extend vertically upward from the base sheet.

6. The battery pack assembly of claim 2, wherein the first sheet directly contacts an axially facing side of the first battery cell, and the second sheet directly contacts an axially facing side of the second battery cell.

7. The battery pack assembly of claim 1, further comprising a heater configured to heat the flow of air prior to the flow of air moving through the channel.

8. The battery pack assembly of claim 1, further comprising a chiller configured to cool the flow of air prior to the flow of air moving through the channel.

9. The battery pack assembly of claim 1, wherein the cell stack is part of a traction battery pack assembly.

10. The battery pack assembly of claim 1, wherein the first battery cell and the second battery cell are axially adjacent to each other.

11. The battery pack assembly of claim 2, wherein the first sheet is in direct contact with the first battery cell and the second sheet is in direct contact with the second battery cell, wherein the first sheet and the second sheet establish the channel.

12. A battery pack assembly, comprising:
a cell stack including a plurality of battery cells arranged along an axis;
a plurality of thermal energy transfer assemblies disposed between axially adjacent battery cells within the plurality of battery cells,
wherein each thermal energy transfer assembly includes opposing members spaced apart to define at least one air channel therebetween, the opposing members being positioned between axially facing surfaces of a first battery cell and a second battery cell that are adjacent along the axis, and the at least one air channel being configured to permit airflow between the opposing members to transfer thermal energy from the first battery cell and the second battery cell; and
a coolant plate assembly adjacent the battery cells and the thermal energy transfer assemblies, the coolant plate assembly defining a plurality of coolant paths configured to convey a liquid coolant.

13. The battery pack assembly of claim 12, wherein the battery cells and the thermal energy transfer assemblies alternate along the axis.

14. The battery pack assembly of claim 12, wherein the thermal energy transfer assemblies are thermally coupled to the coolant plate to transfer thermal energy from the battery cells to the liquid coolant.

15. A battery pack assembly, comprising:

a plurality of battery cells arranged in a stacked configuration along an axis;

one or more thermal energy transfer assemblies disposed between adjacent subsets of the battery cells, each thermal energy transfer assembly defining an air passage configured to permit airflow between the adjacent subsets of battery cells; and a liquid cooling system configured to circulate a liquid coolant adjacent the stacked configuration to remove thermal energy from the battery cells, wherein the air passage and the liquid cooling system cooperate to provide combined air cooling and liquid cooling of the battery cells.

16. The battery pack assembly of claim 15, wherein each thermal energy transfer assembly includes opposing sheet members spaced apart to define the air passage therebetween.

17. The battery pack assembly of claim 15, further comprising a fan configured to actively drive airflow through the air passage, wherein the liquid cooling system includes a cold plate positioned beneath the cell stack.

18. The battery pack assembly of claim 15, wherein each of the subsets of the battery cells includes a single one of the battery cells.

19. The battery pack assembly of claim 15, wherein the liquid cooling system is configured to circulate the liquid coolant independently of airflow through the air passage.

*   *   *   *   *